United States Patent
Uygun et al.

(10) Patent No.: US 9,507,569 B2
(45) Date of Patent: Nov. 29, 2016

(54) DIGITAL DATA PROCESSING SYSTEMS

(75) Inventors: Erkut Uygun, Cambridge (GB); Jan Guffens, Lubbeek (BE); Paul Tindall, Renhold (GB)

(73) Assignee: u-Blox AG, Thalwil (CH)

( * ) Notice: Subject to any disclaimer, the term of this patent is extended or adjusted under 35 U.S.C. 154(b) by 643 days.

(21) Appl. No.: 13/187,413

(22) Filed: Jul. 20, 2011

(65) Prior Publication Data

US 2012/0023317 A1    Jan. 26, 2012

(30) Foreign Application Priority Data

Jul. 20, 2010    (GB) .................................. 1012181.2

(51) Int. Cl.
*G06F 9/44*    (2006.01)
(52) U.S. Cl.
CPC ....................................... *G06F 8/34* (2013.01)
(58) Field of Classification Search
CPC ... G06F 8/4432; G06F 17/30463; G06F 8/34
USPC ........................................................ 717/104
See application file for complete search history.

(56) References Cited

U.S. PATENT DOCUMENTS

| | | | | |
|---|---|---|---|---|
| 4,847,755 A | * | 7/1989 | Morrison et al. ............. | 712/203 |
| 5,461,266 A | * | 10/1995 | Koreeda et al. ............. | 307/125 |
| 8,161,459 B2 | * | 4/2012 | Gorthi et al. ................. | 717/124 |
| 2007/0033582 A1 | | 2/2007 | Hu et al. | |
| 2007/0135936 A1 | * | 6/2007 | Dumas et al. .................. | 700/29 |
| 2011/0088010 A1 | * | 4/2011 | Dangeville et al. .......... | 717/104 |

FOREIGN PATENT DOCUMENTS

EP    1 762 930 A1    3/2007

OTHER PUBLICATIONS

Marlon Dumas et al., "UML Activity Diagrams as a Workflow Specification Language", 2001, pp. 76-90.*
Dong Xu et al., "Using Adaptive Agents to Automatically Generate Test Scenarios from the UML Activity Diagrams", 2005, pp. 1-8.*

* cited by examiner

*Primary Examiner* — Wei Zhen
*Assistant Examiner* — Lanny Ung
(74) *Attorney, Agent, or Firm* — Blakely, Sokoloff, Taylor & Zafman LLP (57) ABSTRACT

A digital data processing system that is designed to facilitate use of UML activity diagrams.

27 Claims, 11 Drawing Sheets

DIGITAL DATA PROCESSING SYSTEMS

FIELD

The invention relates to digital data processing systems.

BACKGROUND

Unified Modelling Language (UML) can be used to describe systems. A common use of UML is to provide a description of a system that is to be implemented in software. Traditionally, an analyst will study a system that is proposed for implementation in software and produce a UML description of the system. A programmer will then work from the UML description provided by the analyst in order to produce software that implements the system whilst complying with the constraints of the particular architecture of the computing hardware that is to execute the software. Some examples of such constraints are the amount of memory in the computing hardware and the number and processing speed of the processors in the computing hardware.

MIL provides a range of methods for describing systems. One such method is the use of activity diagrams. An activity diagram describes a system in terms of activities and control flows between the activities. The control flows are represented by a set of primitives, and these primitives will now be described by reference to FIGS. 1 to 6.

Figure 1:
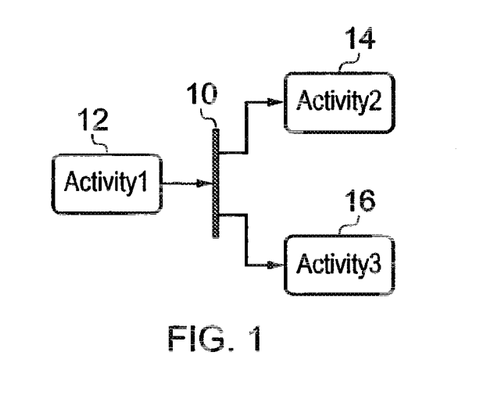
FIG. 1 is a UML activity diagram illustrating use of the fork node.

FIG. 1 shows an activity diagram primitive that is called the fork node. Here a fork node 10 describes the relationship between activities 12, 14 and 16. The fork node 10 indicates that upon completion of activity 12, activities 14 and 16 are commenced concurrently.

Figure 2:
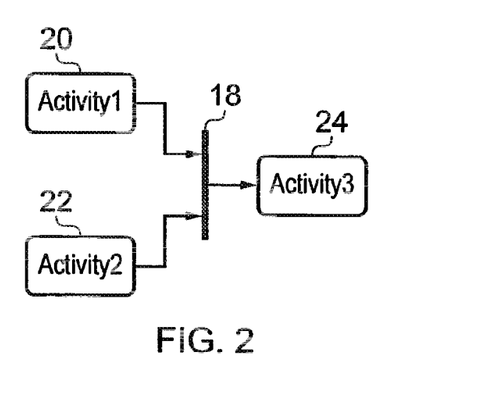
FIG. 2 is a UML activity diagram illustrating use of the join node.

FIG. 2 shows an activity diagram primitive that is called the join node. Here, a join node 18 describes the relationship between activities 20, 22 and 24. The join node 18 indicates that upon completion of both activities 20 and 22, activity 24 is commenced. Thus, the join node primitive has a synchronising effect, in that it allows an activity to commence only after a plurality of other activities have finished.

Figure 3:
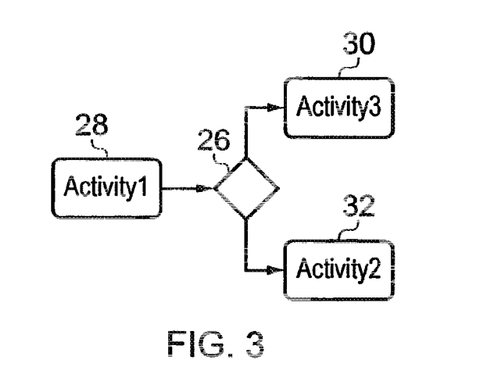
FIG. 3 is a UML activity diagram illustrating use of the decision node.

FIG. 3 shows an activity diagram primitive that is called the decision node. Here, a decision node 26 describes the relationship between activities 28, 30 and 32. The decision node 26 indicates that upon completion of activity 28, only one of activities 30 and 32 is commenced. Which one of activities 30 and 32 is commenced is decided by a logical condition associated with the decision node 26. For example, whether or not a particular parameter of the system is greater or less than some predetermined value.

Figure 4:
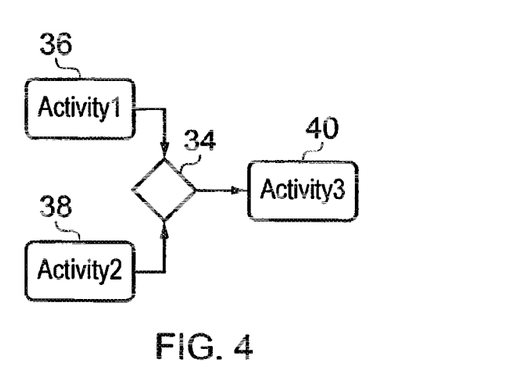
FIG. 4 is a UML activity diagram illustrating use of the merge node.

FIG. 4 shows an activity diagram primitive that is called the merge node. Here, a merge node 34 describes the relationship between activities 36, 38 and 40. The merge node 34 indicates that activity 40 is commenced as soon as either one of activities 36 and 38 is completed.

Figure 5:
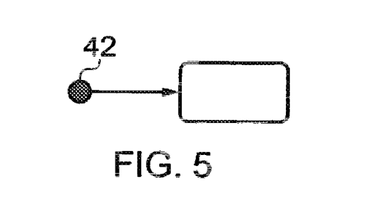
FIG. 5 is a UML activity diagram illustrating use of the initial node.

FIG. 5 shows an activity diagram primitive that is called the initial node. The initial node indicates the start of the system. Here, an initial node 42 indicates that the system begins with the performance of activity 44.

Figure 6:
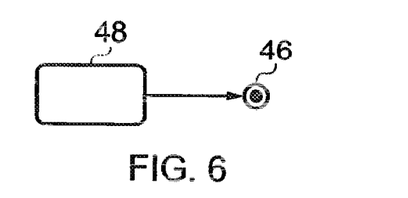
FIG. 6 is a UML activity diagram illustrating use of the final node.

FIG. 6 shows an activity diagram primitive that is called the final node. The final node indicates the end of the system. Here, a final node 46 indicates that the system ends after the performance of activity 48.

So far, nothing has been said about the nature of the activities that the primitives connect. These activities are almost infinitely diverse in nature. Often, an activity will be complex in the sense that it might be capable of being described by its own activity diagram. This document will discuss multiprocessor systems that are suitable for conducting wireless communications and in that context examples of activities are:

carrying out a direct memory access (DMA) procedure for moving data from one place to another.
    performing a fast Fourier transform (DMA) on a digital time domain signal.
    performing a cross correlation of two digital time domain signals.
    calculating a cyclic redundancy checksum (CRC) for a data sequence,

SUMMARY

The invention is defined by the appended claims. to which reference should now be made.

BRIEF DESCRIPTION OF THE DRAWINGS

By way of example only, various embodiments of the invention will now be described by reference to the accompanying drawings, in which.

DETAILED DESCRIPTION

Figure 7:
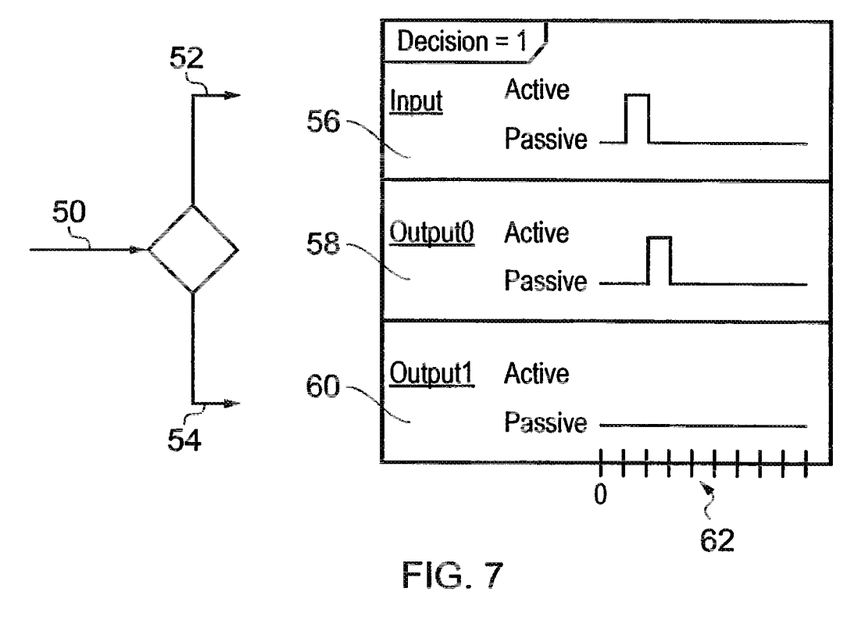
FIG. 7 illustrates the signal flow associated with a decision node.

FIG. 7 illustrates the signal flow associated with a decision node. The drawing shows the primitive's input 50 and its outputs 52 and 54. Alongside are shown three plots. Plot 56 shows the signals travelling on the input 50, plot 58 shows the signals travelling on output 52 and plot 60 shows the signals travelling on output 54. The time scale for all three plots is indicated at 62, and is indicated in arbitrary units (the same convention is used for the time scales in FIGS. 8, 9 and 10). As shown in plot 56, an event signal arrives on input 50 during the second time interval. The primitive responds in the third time period by putting an event signal on one of its outputs 52 and 54, as dictated by the state of the logical condition associated with the primitive. On this occasion, the state of the condition causes the event signal to be emitted on output 58, and nothing is sent on output 60.

Figure 8:
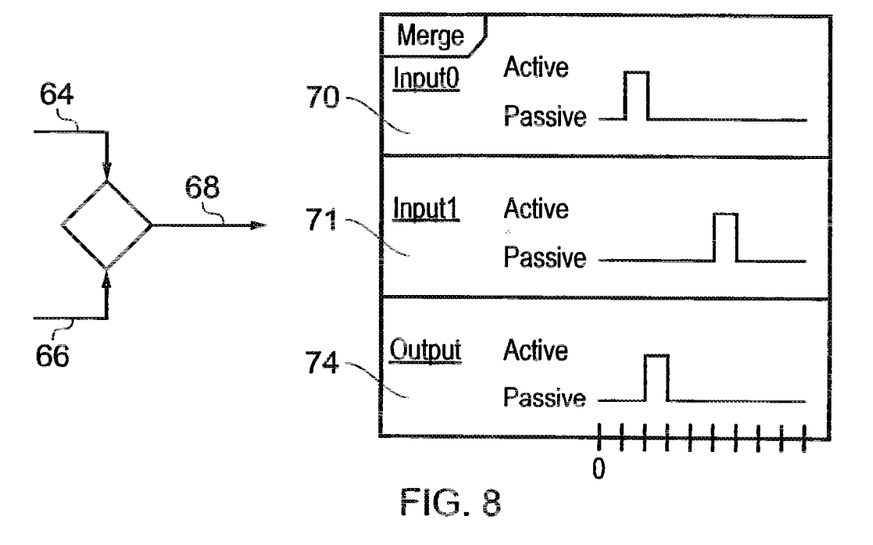
FIG. 8 illustrates the signal flow associated with a merge node.

FIG. 8 illustrates the signal flow associated with a merge node. The drawing shows the primitive's inputs 64 and 66 and its output 68. Alongside are shown three plots. Plot 70 shows the signals travelling on input 64, plot 72 shows the signals travelling on input 66 and plot 74 shows the signals travelling on output 68. As shown in plot 70, an event signal arrives on input 64 during the second time interval. As shown in plot 72, an event signal arrives on input 66 during the sixth time period. As shown in plot 74, the primitive responds to the first event signal that it receives by putting an event signal on its output 68 in the third time period. The primitive does not send a further event signal on its output 68 in response to the later event signal that arrives on input 66.

Figure 9:
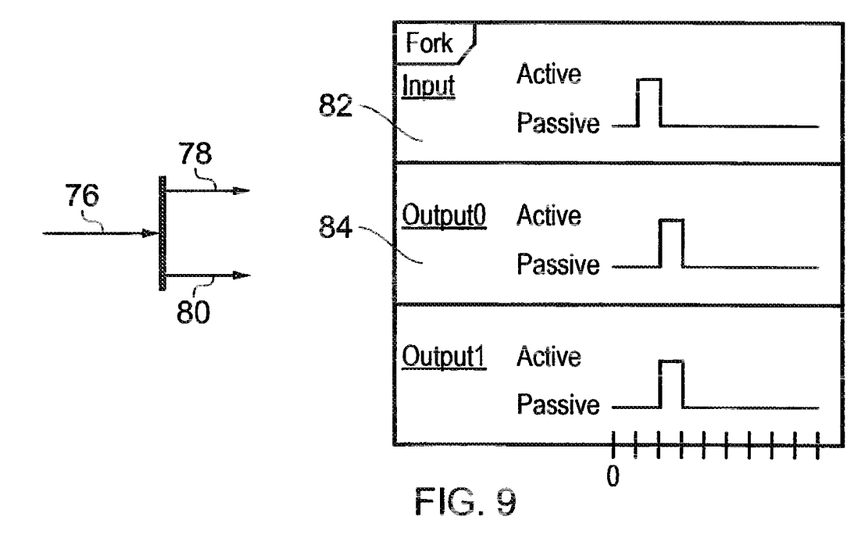
FIG. 9 illustrates the signal flow associated with a fork node.

FIG. 9 illustrates the signal flow associated with a fork node. The drawing shows the primitive's input 76 and its outputs 78 and 80. Alongside are shown three plots. Plot 82 shows the signals travelling on the input 76, plot 84 shows the signals travelling on output 78 and plot 86 shows the signals travelling on output 80. As shown in plot 82, an event signal arrives on input 76 during the second time interval. The primitive responds by putting event signals on both of its outputs 78 and 80 in the third time period.

Figure 10:
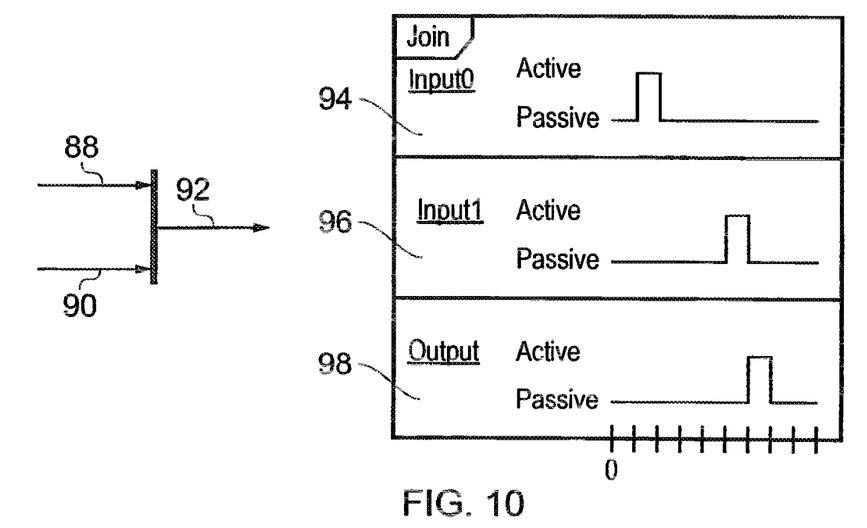
FIG. 10 illustrates the signal flow associated with a join node.

FIG. 10 illustrates the signal flow associated with a join node. The drawing shows the primitive's inputs 88 and 90 and its output 92. Alongside are shown three plots. Plot 94 shows the signals travelling on input 88, plot 96 shows the signals travelling on input 90 and plot 98 shows the signals travelling on output 92. As shown in plot 94, an event signal arrives on input 88 during the second time interval. As shown in plot 96, an event signal arrives on input 90 during the sixth time period. As shown in plot 98, the primitive responds only after each of its inputs 88 and 90 have received an event signal and the response is the emission of an event signal on its output 92 in the seventh time period.

Figure 11:
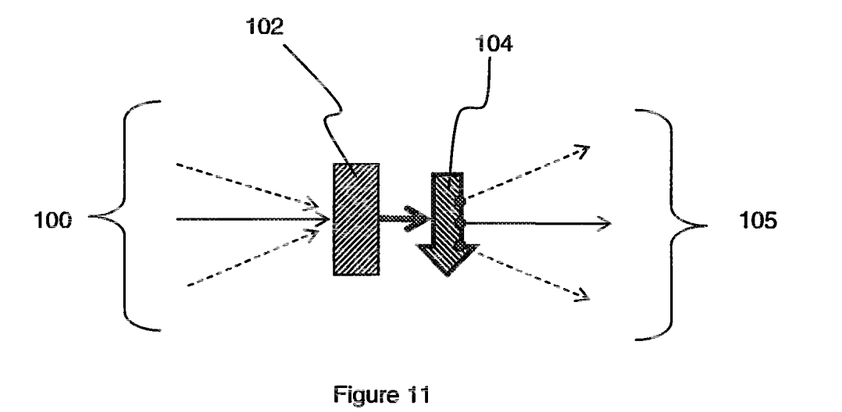
FIG. 11 is a conceptual diagram of a modified form of UML activity diagram primitive.

A feature common to the signal-based descriptions of FIGS. 7 to 10 is that in each case the UML activity diagram primitive can be implemented by a primitive that blocks the control flow until a certain number of event signals are received. As shown in FIG. 11, it is therefore possible to represent a primitive as a barrier 102 that breaks after it has been hit by the right number of event signals 100 (each coming from a different source), triggering the performance of some instructions 104 that cause one or more event signals 105 to be issued (each to a respective destination).

Figure 12:
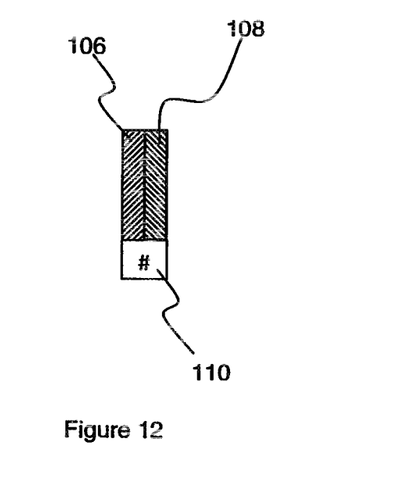
FIG. 12 illustrates a compacted notation for the modified primitive of FIG. 11.

FIG. 12 shows a compacted format of the representation given in FIG. 11, in which the barrier is represented by block 106, the instructions are represented by block 108 and the number of event signals that must hit the barrier 106 to trigger the performance of the instructions 108 is given by a number in block 110. For the remainder of this document, the compacted notation given in FIG. 12 for representing a UML activity diagram primitive shall be referred to as the barrier-counter format (BCF) and the number indicating the number of event signals that have to hit the barrier before the instructions are performed shall be referred to as the count-down value. Note that if the count-down value is zero and an event signal is subsequently received then no action results.

FIGS. 13 to 21 demonstrate how the BCF can be used in UML activity diagrams. Each UML primitive can be mapped into the BCF representation. This mapping steps from a high level representation to an implementation specific representation and is a task that typically can be carried out by a dedicated software compiler.

Figure 13:
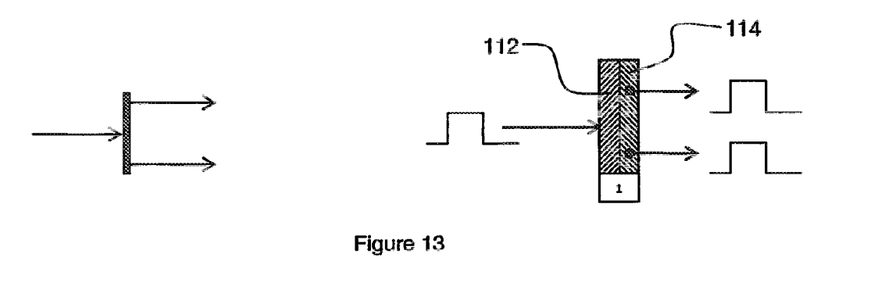
FIG. 13 illustrates how the compacted notation of FIG. 12 can be used to represent a fork primitive.

FIG. 13 illustrates how the UML fork primitive can be implemented using BCF elements. The usual, UML activity diagram version of the primitive appears at the left of the figure, and the BCF version to the right. The count-down value is set to one so that the instructions 114 are performed once the barrier 112 has received one event signal. The instructions 114 specify that two event signals are emitted to respective destinations, e.g. to allow two concurrent activities to be triggered.

Figure 14:
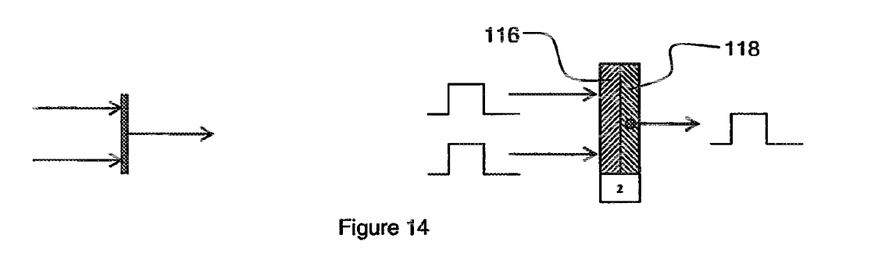
FIG. 14 illustrates how the compacted notation of FIG. 12 can be used to represent a join primitive.

FIG. 14 illustrates how the BCF can be used to implement a join primitive. The usual, UML activity diagram version of the primitive appears at the left of the figure, and the BCF version to the right. This time, the count-down value is set to two so that the instructions 118 are performed once the barrier 116 has received two event signals. The instructions 118 specify a single event signal to be emitted to a specific destination.

Figure 15:
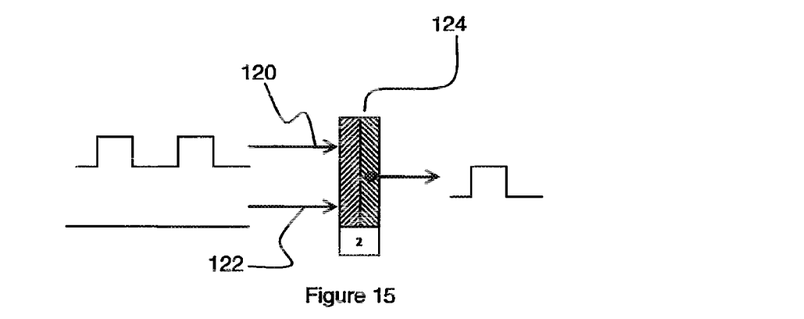
FIG. 15 illustrates how the modified primitive used in FIG. 14 might malfunction under certain conditions.

FIG. 15 illustrates how the particular BCF version of the join primitive of FIG. 12 might malfunction under certain conditions. FIG. 15 shows the situation where two event signals are received on one input 120 of the BCF primitive and no event signals are received on the other input 122. This could happen where, for example, input 120 is connected to a timer that periodically sends out an event signal. In such circumstances, the BCF primitive 124 will emit an event signal even though a join primitive should not do so. The BCF primitive 124 malfunctions because it cannot distinguish whether or not event signals hitting its barrier have a common origin.

Figure 16:
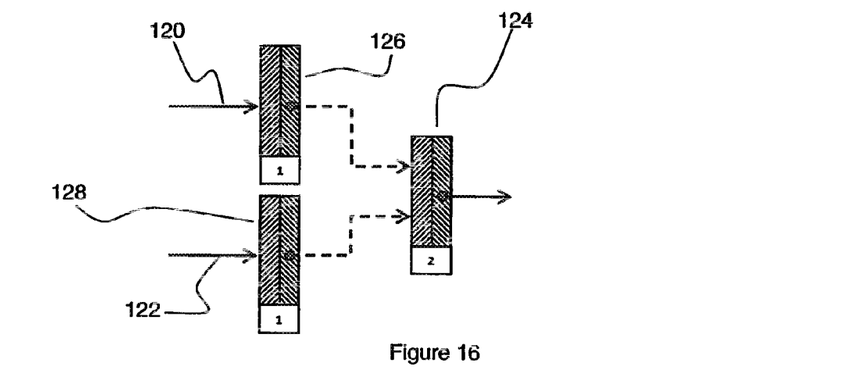
FIG. 16 illustrates how several primitives of the modified form given in FIG. 11 can be used together to represent a join primitive in a way that avoids the malfunction scenario presented in FIG. 15.

FIG. 16 illustrates how the BCF version of the join primitive shown in FIGS. 14 and 15 can be modified to avoid the malfunction scenario presented in FIG. 15. In FIG. 16, two further BCF primitives 126 and 128 are added, each being interposed between the BCF primitive 124 and a respective one of the inputs 120 and 122. BCF primitives 126 and 128 are each given a count-down value of one whilst the count-down value of BCF primitive 124 remains as two. With this modification in place, BCF primitive 124 only emits an event signal after it has received an event signal from each of inputs 120 and 122, this being the correct behaviour of a join primitive.

Figure 17:
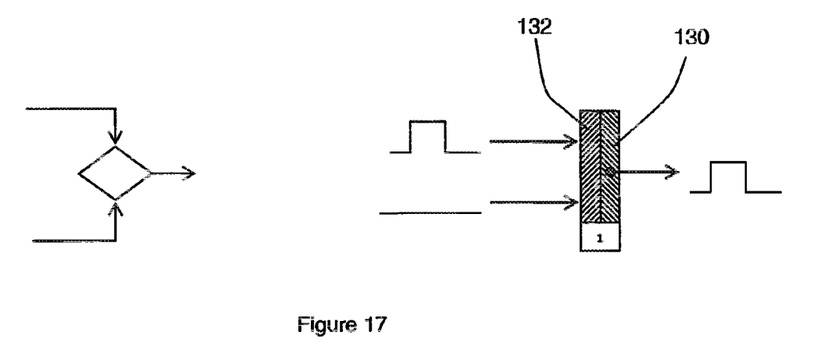
FIG. 17 illustrates how the compacted notation of FIG. 12 can be used to represent a merge primitive.

FIG. 17 illustrates how the BCF can be used to implement a merge primitive. The usual, UML version activity diagram version of the primitive appears at the left of the figure, and the BCF version to the right. The count-down value is set to one so that the instructions 130 are performed after the barrier 132 has received just one event signal, irrespective of which input of the primitive conveys that signal.

Figure 18:
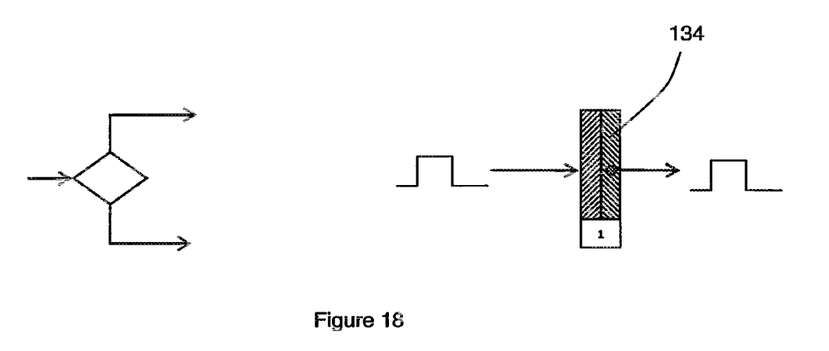
FIG. 18 illustrates how the compacted notation of FIG. 12 can be used to represent a decision primitive.

FIG. 18 illustrates how the BCF can be used to implement a decision primitive. The usual, UML version activity diagram version of the primitive appears at the left of the figure, and the BCF version to the right. The count-down value is set to one so that the instructions 130 are performed after the barrier 136 has received just one event signal, The instructions 134 specify a single event signal to be emitted to a specific destination. The instructions 134 specify a single event signal to be emitted to a specific destination, the destination being determined by the state of a logical condition specified in the instructions 134.

Figure 19:
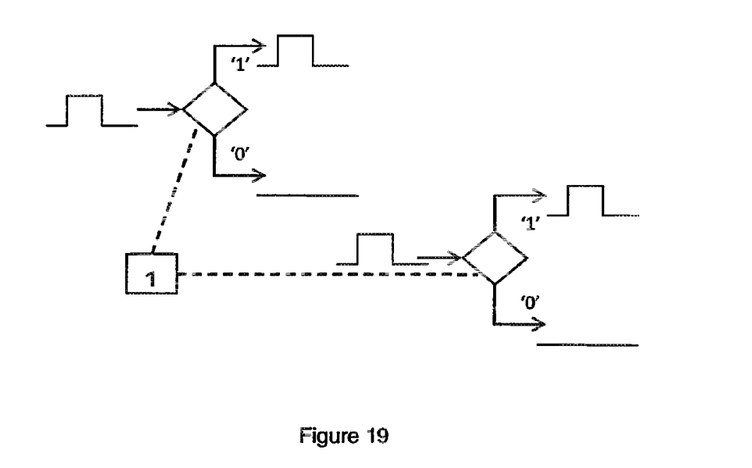
FIG. 19 illustrates how a single logical condition can be used to control more than one instance of the decision primitive.

FIG. 19 serves as a reminder that a single logical condition can be used to control more than one instance of the decision primitive.

Figure 20:
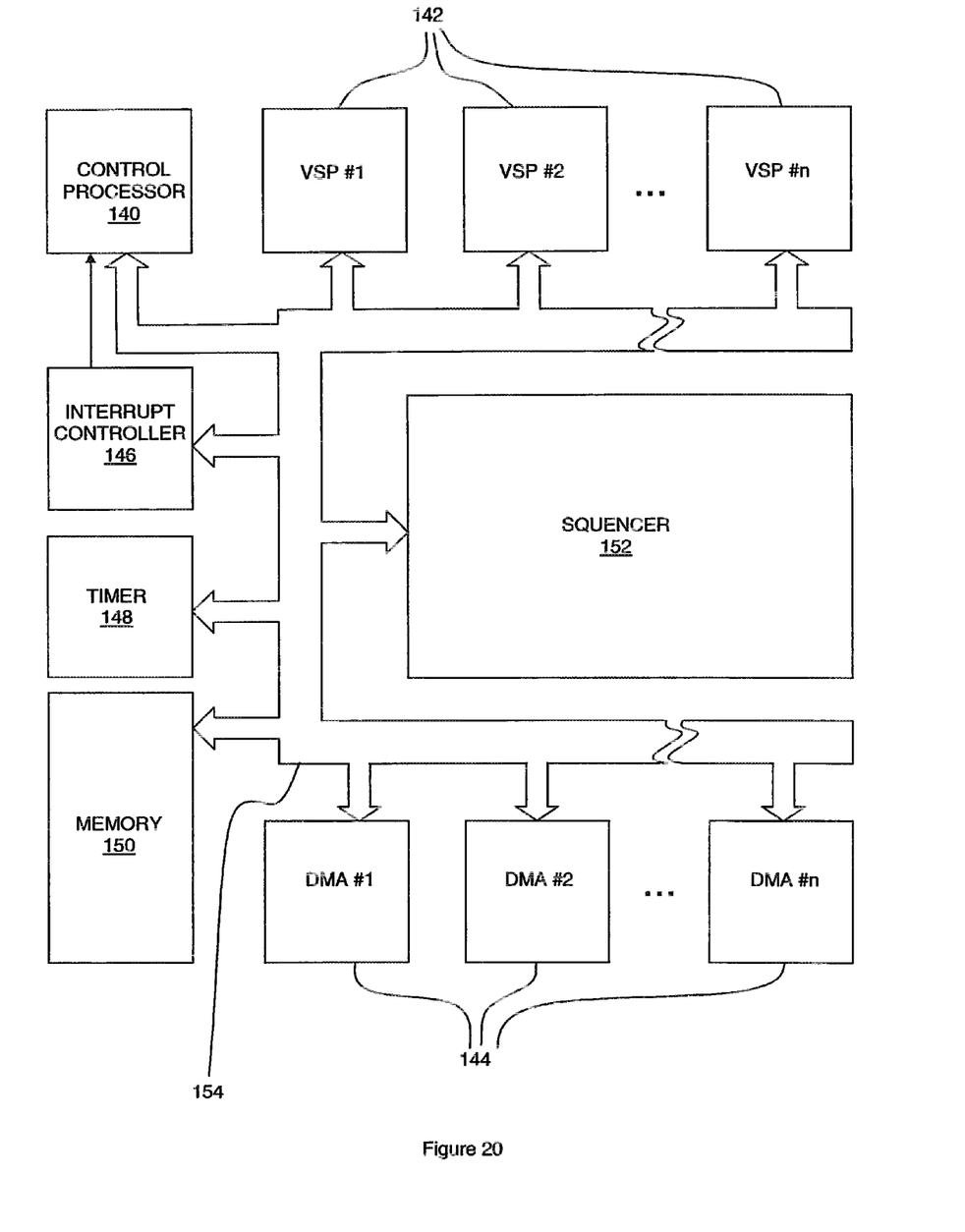
FIG. 20 illustrates schematically a multiprocessor computer.

FIG. 20 shows a multiprocessor computer 138. Only those elements that are useful for explaining the invention are shown and a person skilled in the field of computer architecture design will appreciate that in practice the computer 138 will include many more components and inter-component connections than are shown in FIG. 20. As shown, the computer 138 comprises a central processing unit (CPU) 140, a number of vector signal processors 142, a number of DMA controllers 144, an interrupt controller 146, a timer 148, a memory 150 and a sequencer 152. So that these elements can communicate with one another they are all connected to a bus 154. Furthermore, the interrupt controller 146 is also connected to the CPU 140 by connection 156, over which it can send interrupts to the CPU. The architecture of computer 138 is scalable, for example in that the number of DMA controllers 144, the number of vector signal processors 142, the size of the memory 150 can all be varied and additional timers could be added.

The CPU 140 runs the operating system of the computer. For example, the CPU 140 is an ARM RISC processor. The VSPs 142 are DSPs that are multicore, their cores being designed to operate with very long instruction words (VLIW) that have single instruction, multiple data (SIMD) format. The memory 150 stores the instructions and the data that the computer is to process. The DMA controllers 144 allow instructions and data to be read from, and written to, the memory 150 by, for example, the VSPs 142 without burdening the CPU 140 with the conduct of the transfer process. The interrupt controller 146 is responsible for interrupting the CPU 140 over line 156 when external events such as user inputs need to be processed. The timer 148 emits a signal periodically and the other elements of the computer 138 use the signals from the timer as a time base to effect synchronisation of operations.

The central processing unit (CPU) 140, the vector signal processors 142 and the DMA controllers 144 are all capable of conducting processing in parallel with one another and shall henceforth be referred to as the processing elements of the computer 138. This parallelism is extended to a relatively high degree by the multicore nature of the VSPs 142 and yet further by the VLIW and SIMD capabilities of those cores. This relatively high degree of parallelism means that the architecture of computer 138 lends itself to conducting intensive digital signal processing activities, such as the execution in software of computationally intensive wireless telecommunications modems, such as those of the 3GPP-LTE (Third Generation Partnership Project—Long Term Evolution) and CDMA EV-DO (Code Division Multiple Access; Evolution—Data Optimised) standards. In order to extend the degree of parallelism, the computer 138 can also include additional processing elements connected to the bus 154, often designed to implement specific signal processing activities—such as a Viterbi accelerator, a turbo decoder and an RF to baseband interface.

Figure 21:
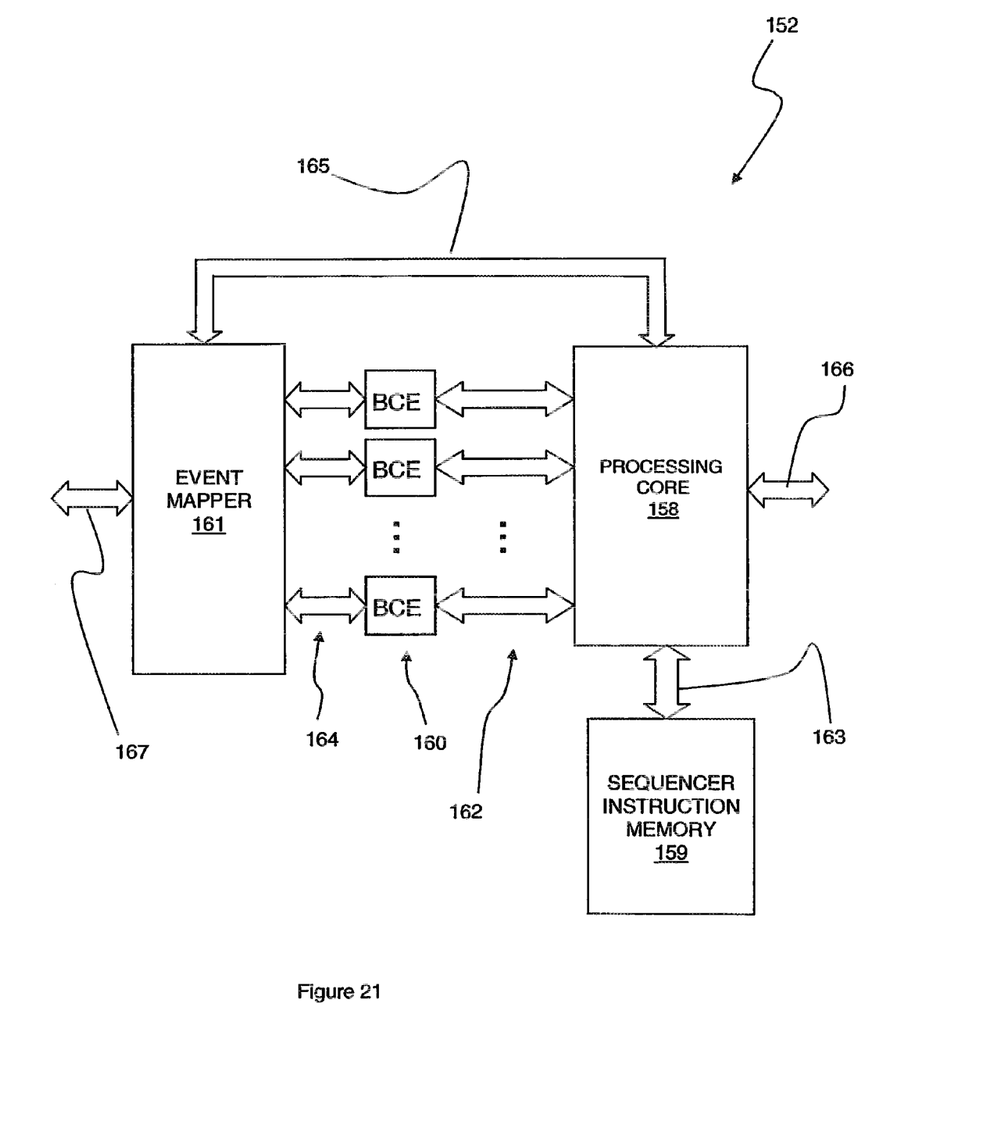
FIG. 21 illustrates schematically the sequencer of FIG. 20.

The sequencer 152 is shown in more detail in FIG. 21. The sequencer 152 comprises a processing core 158, a sequencer instruction memory 159, a number of barrier-counter elements (BCEs), generally indicated 160, and an event mapping block 161.

Each of the BCEs 160 can communicate with the processing core 158 over a respective path, generally indicated 162. Each of the BCEs 160 can communicate with the event mapper 161 over a respective path, generally indicated 164. The processing core 158 and the event mapper 161 are connected to the bus 154 over respective paths 166 and 167. The processing core 158 retrieves its instructions from the sequencer instruction memory 159 over a path 163. In an alternative design, the a sequencer instruction memory 159 could be external to the sequencer 152 and accessed over the bus 154.

Each of the BCEs 160 can be programmed to implement a respective BCF primitive. The event mapper 161 translates end-of-activity hardware signals received over path 167 from the processing elements (e.g. VSPs 142 or DMA controllers 144) into event signals that are passed to the BCEs 160 over the bus 164. The event mapper 161 is programmed by the processing core 158 over path 165. This translation ensures that an end-of-activity signal from a particular processing element is converted into an event signal that is sent to the particular one of the BCEs 160 that is implementing the BCF primitive that, in the UML activity diagram, follows the activity that the processing element in question has just completed.

Figure 22:
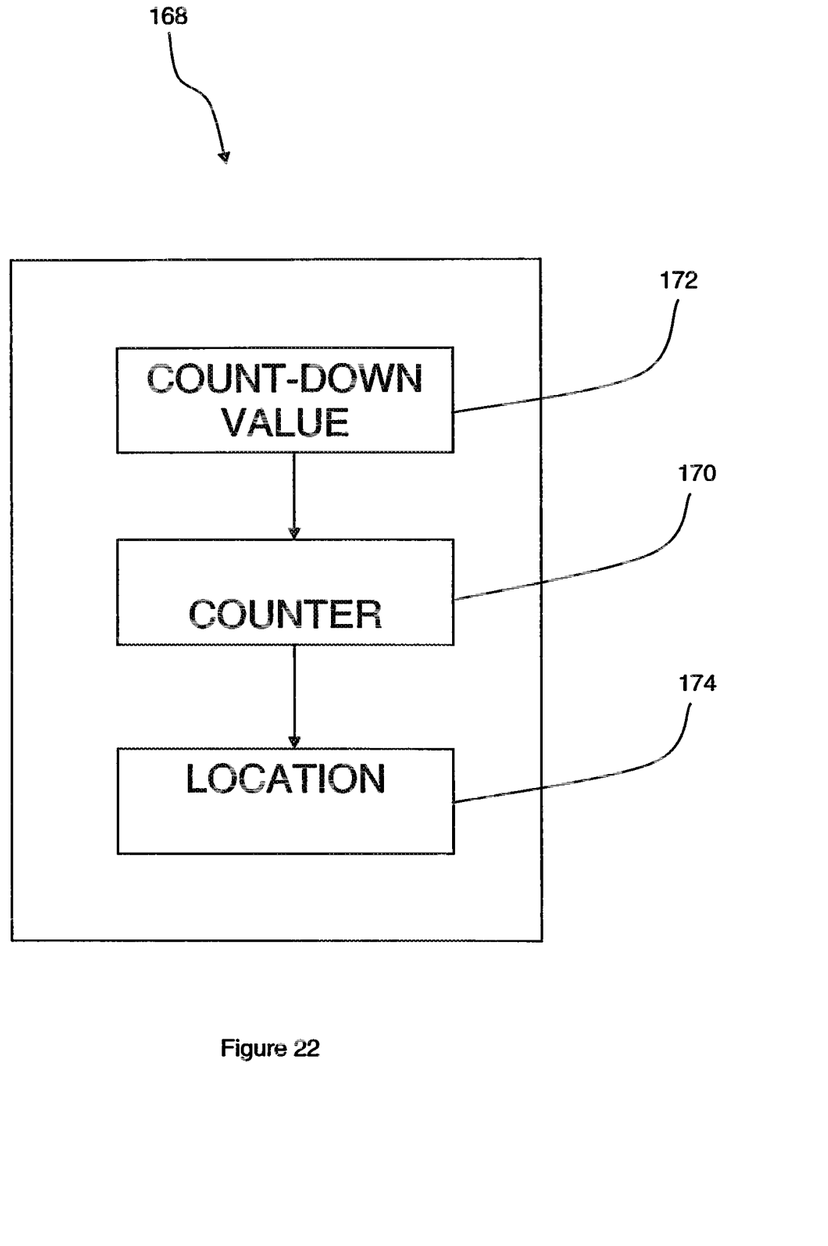
FIG. 22 illustrates schematically a barrier-counter element of FIG. 21.

Each of the BCEs 160 has the same structure and this will be explained by reference to an exemplary BCE 168 that is shown in FIG. 22. The fundamental elements of the exemplary BCE 168 are a counter 170 and two registers 172 and 174. Register 172 is loaded with the count-down value of the BCF primitive that the exemplary BCE 168 is to implement.

Register 174 is loaded with an address in the memory 150 from which the processing core 158 can fetch the instructions that form part of the BCF primitive that the exemplary BCE 168 is to implement. Each time the exemplary BCE 168 receives an event signal, the counter 170 is decremented. When the counter 170 reaches zero. the address contained in register 174 is loaded into a register (not shown) in the processing core 158.

The processing core 158 is designed to react to this event by retrieving and performing a sequence of instructions that begins in the sequencer instruction memory 159 at the address that was received from register 174. These instructions cause the processing core 158 to send each of one or more destinations a respective signal. The nature of the signal that is sent depends on the nature of the destination:
  if the destination is another one of the BCEs 160, then the signal is an event signal intended for decrementing the counter of that further BCE. At UML activity diagram level, the BCF primitive represented by the exemplary BCE 168 is issuing an event signal to another BCF primitive (that is implemented by the destination BCE).
  if the destination is one of the processing elements of the computer 138, then the signal is a command to process a specified sequence of instructions. At UML activity diagram level, the BCF primitive represented by the exemplary BCE 168 is instigating the performance of an activity (which is carried out by the specified processing element performing the specified sequence of instructions).

This represents a slight departure from the definition of the BCF that was given in conjunction with FIG. 12 because, according to that definition, a BCF primitive issues event signals, not commands. However, it must be remembered that the BCF is another way of representing a primitive in an activity diagram and that, in an activity diagram, the commencement of an activity is triggered by an event signal. In contrast, in the computer 138, an activity will be carried out by one of the processing elements and the relevant processing element must be sent a command that will cause that processing element to perform the instructions necessary to carry out the activity in question.

In summary then, the processing core 158 sends event signals to the BCEs 160 (which are implementing UML activity diagram primitives) and commands to processing elements (to perform UML activity diagram activities). A UML activity diagram primitive can receive an event signal from an activity to indicate completion of that activity. To cater for this, the processing elements in the computer 138 send. upon completion of assigned activities, event signals to the relevant ones of the BCEs 160. Most processing elements will send a hardware generated end-of-activity signal to the event mapper 161 that will send the event signal to the BCEs 160.

In a practical implementation of the sequencer 152, there will be a minimum of two BCEs 160 for each processing element in the computer 138, up to a maximum overall number of perhaps one thousand.

Five examples of how the exemplary BCE 168 can be used to implement specific UML activity diagram primitives in specific contexts will now be given.

For the first example, consider the case where the exemplary BCE 168 is to implement the fork primitive 10 shown in FIG. 1 and assume that VSP #2 is performing activity 12, DMA controller #1 is to perform activity 14 and the CPU is to perform activity 16. The BCF version of the fork primitive is shown in FIG. 13. Thus, the count-down value in register 172 is set as one. Upon completion of activity 12, VSP #2 sends an event signal to the exemplary BCE 168 and the counter decrements to zero causing the processing core 158 to perform the sequence of instructions specified by the address in register 174. This sequence of instructions sends a command signal to DMA controller #1 to start activity 14 and another command signal to the interrupt controller 146 to request the CPU 140 to start activity 16.

For the second example, consider the case where the exemplary BCE 168 is to implement the join primitive 18 shown in FIG. 2 and assume that it is appropriate to use the simple version of the BCF join primitive that is shown in FIG. 14. Also assume that DMA controller #1 is performing activity 20, the CPU 140 is performing activity 22 and VSP #2 is to perform activity 24. Thus, in order to implement the join primitive, the value stored in register 172 is two. Assume that DMA controller #1 completes activity 20 before CPU 140 completes activity 22. In this situation, the DMA controller #1 sends an event signal to the exemplary BCE 168 causing the counter 170 to decrement to one. Assume that, some time later, the CPU 140 completes activity 22 and sends an event signal to the exemplary BCE 168. This causes the counter to decrement to zero and causing the processing core 158 to perform the sequence of instructions specified by the address in register 174. This sequence of instructions sends a command signal to VSP #2 to start activity 24.

For the third example, consider the case where the exemplary BCE 168 is to implement the decision primitive 26 shown in FIG. 3 and assume that VSP #2 is performing activity 28, DMA controller #1 is to perform activity 30 and DMA controller #2 is to perform activity 32. The BCF version of the decision primitive is shown in FIG. 18. Thus, in order to implement the decision primitive, the value stored in register 172 is one and the address stored in register 174 is the location in memory 150 where the processing core 158 can find the beginning of a sequence of instructions that causes the logical condition associated with the decision primitive to be evaluated and a command signal to be sent to either DMA controller #1 to commence activity 30 or DMA controller #2 to commence activity 32, whichever is correct according to the state of the logical condition. When VSP #2 completes activity 28, it sends an event signal to the exemplary BCE 168, causing counter 170 to decrement to zero. This triggers the processing core 158 to perform the sequence of instructions specified by the address in register 174, which culminates in the commencement of activity 30 or 32, depending on the state of the associated logical condition.

For the fourth example, consider the case where the exemplary BCE 168 is to implement the merge primitive 34 of FIG. 4 and assume that VSP #1 is to perform activity 36, the CPU 140 is to perform activity 38 and VSP #2 is to perform activity 40. The BCF version of the merge primitive is shown in FIG. 17. Thus, the count-down value in register 172 is set to one. Assume now that VSP #1 completes activity 36 and sends an event signal to the exemplary BCE 168. The arrival of this event signal causes the counter 170 to decrement to zero and this triggers the processing core 158 to perform the sequence of instructions specified by the address in register 174. This sequence of instructions sends a command signal to VSP #2 to start activity 40. It then no longer matters when or if activity 36 completes.

Figure 23:
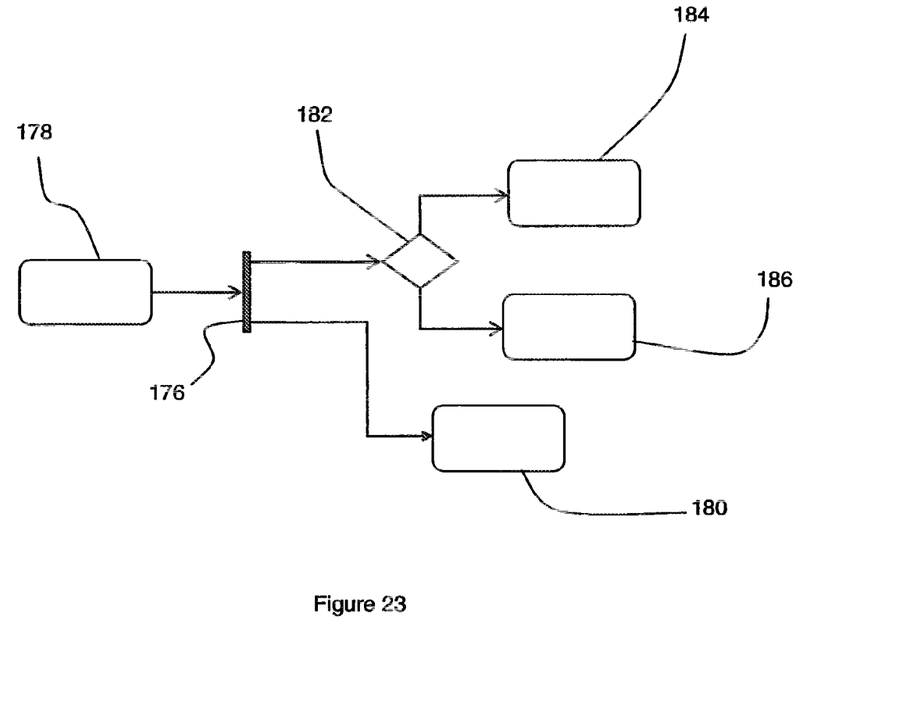
FIG. 23 illustrates an activity diagram where a primitive can trigger another primitive.

For the fifth example, consider the case where the exemplary BCE 168 is to implement the fork primitive 176 shown in FIG. 23 and assume that VSP #2 is performing activity 12, DMA controller #1 is to perform activity 180 and another BCE is implementing the decision primitive which will ultimately initiative either activity 184 or activity 186. The BCF version of the fork primitive is shown in FIG. 13. Thus, the count-down value in register 172 is set as one. Upon completion of activity 178, VSP #2 sends an event signal to the exemplary BCE 168 and the counter decrements to zero causing the processing core 158 to perform the sequence of instructions specified by the address in register 174. This sequence of instructions sends a command signal to DMA controller #1 to start activity 180 and an event signal—not a command signal—to the other BCE that is implementing the decision primitive 182.

It should therefore be apparent that the behaviour of a BCE is defined by its count-down value and the instruction sequence that is triggered when the BCE's counter decrements to zero. The combination of a BCE's count-down value and its instruction sequence shall henceforth be referred to as the BCE's "configuration". The configuration of a BCE can be set so that it fulfils the role of particular primitive at a particular location within a UML activity diagram.

The traditional approach to UML activity diagrams first requires an analyst to study a system that is proposed for implementation in software and produce a UML activity diagram describing the system. Then, a programmer is required to work from the UML activity diagram provided by the analyst in order to produce software that implements the system whilst complying with the constraints of the particular architecture of the computing hardware that is to execute the software. Through the use of sequencer 152, software implementing an activity diagram can now be created directly from a UML activity diagram. This is achieved by providing software code blocks tor each activity in the UML activity diagram and by converting each primitive of the UML activity diagram into a corresponding BCF primitive that is implemented by a BCE that is given an appropriate configuration.

Figure 24:
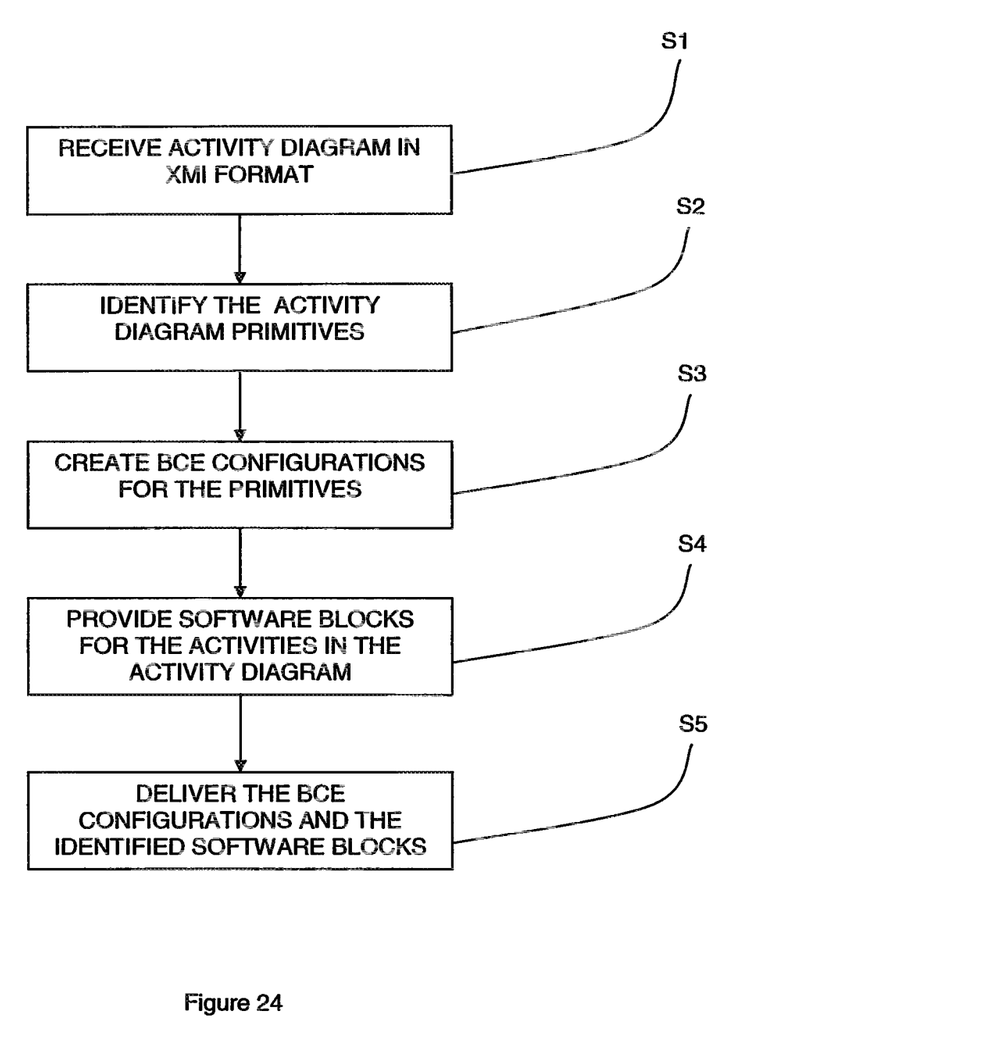
FIG. 24 illustrates the operation of a tool for generating software that can be executed using the sequencer of FIG. 20.

UML activity diagrams are normally created in XMI (XML (Extensible Mark-up Language) Metadata Interchange) format. FIG. 24 is a flow chart describing a software tool for automatically generating a software package that can be executed by the sequencer 152 to implement a system that is described in an XMI format UML activity diagram. The tool is provided with knowledge of the architecture of the computer 138, e.g. the number of VSPs 142, the number of DMA controllers 144, the size of the memory 150, the processing speed of the various elements and the power consumption of the various elements. The tool is also provided with a library of software blocks, each for execution by one the processing elements to perform one of the activities of the XMI UML activity diagram. The tool is also provided with indications of how long the software blocks take to execute on their respective processing elements.

In step S1, the XMI format UML activity diagram is provided. In step S2, the tool identifies the primitives in the XMI format UML activity diagram. In step S3, the tool creates individual BCE configurations for the primitives that it has identified. In step S4, the tool searches a library to identify for each activity of the activity diagram a software block that can be executed by one of the processing elements to perform that activity. The set of BCE configurations that is derived and the set of software blocks that is selected are arrived at by the tool taking into account any constraints that are specified for the power consumption of the computer 138 and the amount of time that the computer should take to perform the or some particular part of the system represented by the XMI UML activity diagram. In step S5, the tool delivers the BCE configurations and the identified software blocks as a software package that can be executed by the sequencer 152 to implement the system that is described by the XMI format UML activity diagram.

The sequencer 152 can then implement the system described by the XMI UML activity diagram in software by configuring its BCEs 160 with the configurations determined in step S3 so that the BCEs then command the processing elements to perform, when necessary, the identified software blocks identified in step 54.

The software tool can be enhanced if desired by also including one or more of the following features:

the tool can assess whether the target architecture's processing elements can also accommodate the execution of an additional process besides the activities of the target system. It may be the case that the tool can in fact identify that the processing elements have sufficient spare capacity to execute not only the "thread" for the current UML activity diagram but also one or more additional threads each corresponding to software implementing a further UML activity diagram. In which case, the software tool can be arranged to rearrange the scheduling of the multiple threads on the processing elements, thereby implementing a form of virtualisation.

the tool can be arranged to include break points in the generated software, at the start and end points of activities. These break points can then be shown in a graphical user interface (GUI) representation of the activity diagram and the performance of the software can then be assessed at the level of the activity diagram.

Various modifications can be made to the technology described above without departing from the scope of the invention. For example, the BCEs 160 were described as counting down from a programmable value to zero in order to trigger the execution of code through the processing core 158. In an alternative implementation however, the BCEs 160 could be arranged to count up from zero until some programmable value is reached in order to trigger the code execution.

The concept of the sequencer 152 directing the operation of a group a processing elements that can operate in parallel can be used in computers that are intended for various different purposes. For example, the concept can be used in a computer that is intended to implement in software wireless communications modems, such as those from the 3GPP LTE and CDMA EV-DO standards.

What is claimed is:

1. A sequencer for a computer, wherein:
  a) the computer is suitable for executing a software implementation of a unified modeling language activity diagram;
  b) the diagram comprises a plurality of activities that are connected by primitives that are triggered by, and emit, event signals;
  c) the computer comprises a plurality of processing elements that can conduct processing in parallel with one another, each processing element being capable of performing at least one of said activities; and
  d) the sequencer is arranged to implement the primitives and comprises:
    d1) a detector configured to detect that a primitive has received a plurality of event signals necessary for it to trigger, wherein the detector comprises a counter arranged to count a number of received event signals and the detector is arranged to trigger its respective primitive when a certain number of event signals are received irrespective of which input of the primitive conveys the event signals, including multiple event signals received on a single input, and wherein the detector cannot distinguish whether or not the event signals are received on a common input;
    d2) a signaler arranged to respond to the detection of the triggering of a primitive by executing a sequence of instructions that gives a response that is at least one of:
      d2a) instructing a processing element to perform an activity that, in the diagram, is a recipient of an event signal from the triggered primitive; and
      d2b) sending to the detector an event signal for another primitive.

2. The sequencer according to claim 1, wherein the detector comprises a plurality of detection elements and each detection element is arranged to detect that a respective primitive has received the event signal or signals necessary for it to trigger and to inform the signaler that the respective primitive has been triggered.

3. The sequencer according to claim 2, wherein each of the plurality of detection elements comprises a separate counter arranged to count the event signal or signals that are needed to trigger a respective primitive of said each of the plurality of detection elements.

4. The sequencer according to claim 2, wherein at least one detection element is capable of being reconfigured by the sequencer to implement another primitive after it has been triggered.

5. The sequencer according to claim 1, wherein the signaler comprises a processing core that reacts to an indication that a primitive has been triggered by performing a sequence of instructions linked to that primitive, which instructions cause the core to make said response.

6. The sequencer according to claim 1, wherein the processing elements comprise two or more of a vector signal processor, a central processing unit, a Viterbi accelerator, a turbo decoder, a digital interface to external radio transceivers, and a direct memory access controller.

7. The sequencer according to claim 1, wherein the sequencer is arranged to arrange the execution of the activities of the diagram on the computer to minimise a cost function that is one of, or based on one of, resource utilisation within the computer and power consumption within the computer.

8. The sequencer according to claim 1, wherein the sequencer comprises an inhibitor arranged to prevent power consumption by a processing element during a period that the sequencer knows that the processing element will not be performing any of said activities.

9. The sequencer according to claim 1, wherein the sequencer comprises a controller arranged to control system resources to minimize overall system resource usage.

10. The sequencer according to claim 1, wherein the detector is a first detector and the sequencer further comprises:
 a second detector, wherein the second detector comprises a counter arranged to count a number of received event signals and the second detector is arranged to provide an event signal to the first detector when a single event signal is received by the second detector; and
 a third detector, wherein the third detector comprises a counter arranged to count a number of received event signals and the third detector is arranged to provide an event signal to the first detector when a single event signal is received by the third detector; and
 wherein the first detector is arranged to trigger its respective primitive when the first detector receives two event signals irrespective of which of the second and third detectors conveys the event signals, and wherein the first detector cannot distinguish whether each received event signal is received from the second detector or the third detector.

11. The sequencer according to claim 1, wherein the primitive is a fork node or a decision node.

12. The sequencer according to claim 1, wherein the primitive is a join node or a merge node.

13. A computer suitable for executing a software implementation of a unified modeling language activity diagram; wherein:
 e) the diagram comprises a plurality of activities that are connected by primitives that are triggered by, and emit, event signals; and
 f) the computer comprises:
  f1) a plurality of processing elements that can conduct processing in parallel with one another, each processing element being capable of performing at least one of said activities; and
  f2) a sequencer arranged to implement the primitives, and comprising:
   f2a) a detector configured to detect that a primitive has received a plurality of event signals necessary for it to trigger, wherein the detector comprises a counter arranged to count a number of received event signals and the detector is arranged to trigger its respective primitive when a certain number of event signals are received irrespective of which input of the primitive conveys the event signals, including multiple event signals received on a single input, and wherein the detector cannot distinguish whether or not the event signals are received on a common input;
   f2b) a signaler arranged to respond to the detection of the triggering of a primitive by giving a response that is at least one of:
    f2b1) instructing a processing element to perform an activity that, in the diagram, is a recipient of an event signal from the triggered primitive; and
    f2b2) sending to the detector an event signal for another primitive.

14. The computer according to claim 13, further comprising a timer and wherein at least one event signal is a pulse sent by the timer.

15. The computer according to claim 13, wherein the detector is a first detector and the sequencer further comprises:
 a second detector, wherein the second detector comprises a counter arranged to count a number of received event signals and the second detector is arranged to provide an event signal to the first detector when a single event signal is received by the second detector; and
 a third detector, wherein the third detector comprises a counter arranged to count a number of received event signals and the third detector is arranged to provide an event signal to the first detector when a single event signal is received by the third detector; and
 wherein the first detector is arranged to trigger its respective primitive when the first detector receives two event signals irrespective of which of the second and third detectors conveys the event signals, and wherein the first detector cannot distinguish whether each received event signal is received from the second detector or the third detector.

16. The computer according to claim 13, wherein the primitive is a fork node or a decision node.

17. The computer according to claim 13, wherein the primitive is a join node or a merge node.

18. A method of sequencing activities in a computer, wherein:
 g) the computer is suitable for executing a software implementation of a unified modeling language activity diagram;
 h) the diagram comprises a plurality of activities that are connected by primitives that are triggered by, and emit, event signals;
 i) the computer comprises a plurality of processing elements that can conduct processing in parallel with one another, each processing element being capable of performing at least one of said activities; and
 j) the method comprises:
  j1) detecting that a primitive has received a plurality of event signals necessary for it to trigger by counting a number of received event signals and triggering the primitive when a certain number of event signals are received irrespective of which input of the primitive conveys the event signals, including multiple event signals received on a single input, and wherein the detecting cannot distinguish whether or not the event signals are received on a common input;

j2) responding to the detection of the triggering of a primitive by giving a response that is at least one of:

j2a) instructing a processing element to perform an activity that in the diagram, is a recipient of an event signal from the triggered primitive: and j2b) sending to the detector an event signal for another primitive.

19. The method according to claim 18, wherein the primitive is a fork node or a decision node.

20. The method according to claim 18, wherein the primitive is a join node or a merge node.

21. A computer processing system, comprising:

a memory; and a processor coupled with the memory to execute a compiler for generating software that can be executed by the computer processing system to implement a system that is described by a unified modeling language activity diagram, wherein:

k) the diagram comprises a plurality of activities that are connected by primitives that are triggered by, and emit, event signals;

l) the computer processing system further comprises a plurality of processing elements executed by the processor that can conduct processing in parallel with one another, each processing element being capable of performing at least one of said activities; and m) a sequencer is arranged to implement the primitives and comprises:

m1) a detector configured to detect that a primitive has received a plurality of event signals necessary for it to trigger, wherein the detector comprises a counter arranged to count a number of received event signals and the detector is arranged to trigger its respective primitive when a certain number of event signals are received irrespective of which input of the primitive conveys the event signals, including multiple event signals received on a single input, and wherein the detector cannot distinguish whether or not the event signals are received on a common input;

m2) a signaler arranged to respond to the detection of the triggering of a primitive by executing a sequence of instructions that gives a response that is at least one of:

m2a) instructing a processing element to perform an activity that, in the diagram, is a recipient of an event signal from the triggered primitive; and m2b) sending to the detector an event signal for another primitive; and n) the compiler comprises:

n1) a searcher arranged to identify the primitives in the activity diagram; and n2) a generator arranged to generate code that will cause the sequencer to implement the identified primitives.

22. The computer processing system according to claim 21, wherein the compiler further comprises an optimiser arranged to optimise software in terms of a power efficiency of the computer processing system that will contain the sequencer.

23. The computer processing system according to claim 21, wherein the compiler further comprises an optimiser arranged to optimise software in terms of a speed of the execution of the computer processing system that will contain the sequencer.

24. The computer processing system according to claim 21, wherein the detector is a first detector and the sequencer further comprises:

a second detector, wherein the second detector comprises a counter arranged to count a number of received event signals and the second detector is arranged to provide an event signal to the first detector when a single event signal is received by the second detector; and a third detector, wherein the third detector comprises a counter arranged to count a number of received event signals and the third detector is arranged to provide an event signal to the first detector when a single event signal is received by the third detector; and wherein the first detector is arranged to trigger its respective primitive when the first detector receives two event signals irrespective of which of the second and third detectors conveys the event signals, and wherein the first detector cannot distinguish whether each received event signal is received from the second detector or the third detector.

25. The computer processing system according to claim 21, wherein the primitive is a fork node or a decision node.

26. The computer processing system according to claim 21, wherein the primitive is a join node or a merge node.

27. A non-transitory computer readable medium storing a program which, when executed, will cause a computer to perform a method of sequencing activities in the computer, wherein:

o) the computer is suitable for executing a software implementation of a unified modeling language activity diagram;

p) the diagram comprises a plurality of activities that are connected by primitives that are triggered by, and emit, event signals;

q) the computer comprises a plurality of processing elements that can conduct processing in parallel with one another, each processing element being capable of performing at least one of said activities; and r) the method comprises:

r1) detecting that a primitive has received a plurality of event signals necessary for it to trigger by counting a number of received event signals and triggering the primitive when a certain number of event signals are received irrespective of which input of the primitive conveys the event signals, including multiple event signals received on a single input, and wherein the detecting cannot distinguish whether or not the event signals are received on a common input;

r2) responding to the detection of the triggering of a primitive by giving a response that is at least one of:

r2a) instructing a processing element to perform an activity that, in the diagram, is a recipient of an event signal from the triggered primitive; and r2b) sending to the detector an event signal for another primitive.

* * * * *